(12) United States Patent
Strengert et al.

(10) Patent No.: US 9,421,953 B2
(45) Date of Patent: Aug. 23, 2016

(54) CONTROL DEVICE FOR A VEHICLE BRAKE SYSTEM, AND METHOD FOR OPERATING A VEHICLE BRAKE SYSTEM

(75) Inventors: Stefan Strengert, Stuttgart (DE); Michael Kunz, Steinheim an der Murr (DE); Dirk Drotleff, Oberstenfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 141 days.

(21) Appl. No.: 14/118,027

(22) PCT Filed: Mar. 19, 2012

(86) PCT No.: PCT/EP2012/054790
§ 371 (c)(1),
(2), (4) Date: Feb. 4, 2014

(87) PCT Pub. No.: WO2012/156125
PCT Pub. Date: Nov. 22, 2012

(65) Prior Publication Data
US 2014/0142829 A1 May 22, 2014

(30) Foreign Application Priority Data
May 17, 2011 (DE) ........................ 10 2011 075 968

(51) Int. Cl.
*B60T 8/17* (2006.01)
*B60T 13/68* (2006.01)
(Continued)

(52) U.S. Cl.
CPC .. *B60T 8/17* (2013.01); *B60L 7/26* (2013.01); *B60T 1/10* (2013.01); *B60T 8/4072* (2013.01);
(Continued)

(58) Field of Classification Search
None
See application file for complete search history.

(56) References Cited

U.S. PATENT DOCUMENTS 5,322,352 A * 6/1994 Ohno et al. .................. 303/3
5,568,962 A 10/1996 Enomoto et al.
(Continued)

FOREIGN PATENT DOCUMENTS

CN 1172456 A 2/1998
CN 1978256 A 6/2007
(Continued)

OTHER PUBLICATIONS

International Search Report for PCT/EP2012/054790, issued on Jun. 20, 2012.

*Primary Examiner* — Fadey Jabr
*Assistant Examiner* — Kevin P Mahne
(74) *Attorney, Agent, or Firm* — Norton Rose Fulbright US LLP

(57) ABSTRACT

A control device is described for a brake system of a vehicle, having a valve control device that is designed to determine, at least taking into account a provided information signal relating to a generator braking moment of a generator that is currently being exerted or is to be exerted, a first target state of a first valve of the brake system that is connected to a master brake cylinder of the brake system and to a fluid storage device of the brake system in such a way that a brake fluid volume can be displaced out of the master brake cylinder into the fluid storage device via the first valve, which is controlled into an at least partly open state, and to output a first control signal, corresponding to the first target state, to the first valve, the first target state being determinable, by the valve control device, for a valve connected via at least one intake line to a brake medium reservoir of the brake system as fluid storage device, as first valve. In addition, a method is described for operating a brake system of a vehicle.

8 Claims, 8 Drawing Sheets

(51) Int. Cl.
  *B60T 1/02* (2006.01)
  *B60L 7/26* (2006.01)
  *B60W 10/188* (2012.01)
  *B60T 1/10* (2006.01)
  *B60T 8/40* (2006.01)
  *B60T 13/58* (2006.01)
  *B60T 15/02* (2006.01)
  *B60W 30/18* (2012.01)

(52) U.S. Cl.
  CPC .............. *B60T 13/586* (2013.01); *B60T 13/68* (2013.01); *B60T 13/686* (2013.01); *B60T 15/025* (2013.01); *B60T 1/02* (2013.01); *B60T 2270/604* (2013.01); *B60W 10/188* (2013.01); *B60W 30/18127* (2013.01); *B60W 2510/083* (2013.01); *B60W 2710/182* (2013.01)

(56) References Cited

U.S. PATENT DOCUMENTS

| | | | |
|---|---|---|---|
| 5,853,229 A | | 12/1998 | Willmann et al. |
| 5,882,093 A | * | 3/1999 | Enomoto et al. ............. 303/152 |
| 5,951,115 A | * | 9/1999 | Sakai et al. ...................... 303/3 |
| 2006/0102394 A1 | * | 5/2006 | Oliver .......................... 180/65.2 |
| 2007/0013230 A1 | * | 1/2007 | Yang ............................ 303/152 |
| 2007/0272457 A1 | * | 11/2007 | Kodama et al. ............. 180/65.3 |
| 2008/0084107 A1 | | 4/2008 | Yanai et al. |
| 2009/0179486 A1 | * | 7/2009 | Ikeda et al. ................... 303/152 |
| 2010/0187901 A1 | * | 7/2010 | Sonoda et al. .................. 303/11 |
| 2011/0066345 A1 | * | 3/2011 | Nasu et al. ...................... 701/70 |
| 2012/0056471 A1 | * | 3/2012 | Plewnia et al. ................... 303/3 |

FOREIGN PATENT DOCUMENTS

| | | |
|---|---|---|
| DE | 19604134 | 8/1997 |
| DE | 102004044599 A1 | 4/2005 |
| EP | 1795412 | 6/2007 |
| GB | 2454064 | 4/2009 |
| JP | 11-208436 | 8/1999 |
| JP | 2000-354302 | 12/2000 |
| JP | 2007-153311 | 6/2007 |
| WO | 2004101308 A1 | 11/2004 |
| WO | WO 2011/052007 | 5/2011 |

* cited by examiner

CONTROL DEVICE FOR A VEHICLE BRAKE SYSTEM, AND METHOD FOR OPERATING A VEHICLE BRAKE SYSTEM

FIELD OF THE INVENTION

The present invention relates to a control device for a brake system of a vehicle. In addition, the present invention relates to a method for operating a brake system of a vehicle.

BACKGROUND INFORMATION

German Published Patent Appln. No. 196 04 134 describes a method and a device for controlling a brake system of a motor vehicle having an electric drive. When there is a braking of the vehicle using the electric drive for the simultaneous charging of a battery, the hydraulic braking moment applied to at least one wheel by the at least one wheel brake cylinder of the hydraulic brake system is to be reduced/deactivated, despite an actuation of the brake pedal. For this purpose, the pressure medium, displaced out of the master brake cylinder to the wheel brakes by the actuation of the brake pedal, is to be counteracted in that, by opening the outlet valves of the hydraulic brake system, the pressure medium displaced out of the master brake cylinder is transferred into at least one storage chamber via the at least one wheel brake cylinder. In this way, a regenerative braking carried out by the electric drive is to be maskable.

SUMMARY

The present invention creates a control device for a brake system of a vehicle, a brake system for a vehicle, and a method for operating a brake system of a vehicle.

The present invention enables a transfer of a volume of brake fluid pressed out of the master brake cylinder into the brake medium reservoir, bypassing the at least one wheel brake cylinder. The transfer thus takes place without building up a residual pressure in the at least one wheel brake cylinder, or without building up a hydraulic "residual braking moment" at a wheel.

The brake system that can be realized by the present invention can be described as a simple system expanded by a minimum modification outlay. In this way, it is possible to achieve a sufficient recuperative efficiency with a minimum of additional costs.

The increase in the recuperative efficiency in the present invention is based principally in that the proposed brake system supports the driver during the modulation task in the case in which a regenerative braking moment is not present. The technology according to the present invention is capable of reacting to a reduced recuperative braking moment of the recuperative brake, for example due to a full energy storage device and/or a vehicle speed that is lower than the minimum speed required for recuperative braking. In particular, this can be realized without lengthening the braking path, and without the driver noticing a reaction effect when the brake actuating element is actuated.

It is to be noted that the capacity to realize the technology according to the present invention does not require any free travel formed at the brake actuating element, the brake force booster, or in the master brake cylinder. Thus, the driver can brake into the braking system quickly even in the safe or fallback operating state.

An advantageous development has a jump-in. This can be described as being that the brake system has a brake actuating element that is situated on the master brake cylinder in such a way that during the actuation of the brake actuating element with an actuation strength not equal to zero but lower than the minimum actuation strength at which the driver's braking force applied to the brake actuating element can be transmitted to the master brake cylinder piston, a transmission of force between the brake actuating element and the master brake cylinder piston is not present/is (almost) prevented. This enables a masking when there is an absence/prevention of a transmission of force between the brake actuating element and the master brake cylinder piston. Thus, an altered braking feeling will not be perceptible by the driver in the case of a regenerative braking instead of a hydraulic braking. Due to the absent/(almost) prevented transmission of force between the master brake cylinder piston and the brake actuating element, due for example to a negligible (possibly absent) mechanical coupling given an actuation strength below the minimum actuation strength, the counter-force caused by the hydraulic pressure buildup is not supported at the brake actuating element, but rather only by the boosting force of the brake force booster. The change in the counter-force is therefore not perceptible by the driver at the brake actuating element. At the same time, according to the present invention the driver has the possibility of braking directly into the master braking cylinder via an actuation of the brake actuating element with at least the minimum actuation strength. Thus, even in the case of functional impairment of the brake force booster, due for example to an impairment of the power supply of the brake system, reliable braking of the vehicle is still ensured.

This can also be referred to as a masking within the jump-in region (of the brake force booster). The jump-in region is an actuation region of the brake force booster, such as for example a vacuum booster, in which no/a negligible mechanical coupling exists between the brake actuating element and the master brake cylinder piston. Nonetheless, braking into the master brake cylinder takes place already in the jump-in region. Thus, the brake system does not have any free travel, and can be reliably operated in particular in the safe or fallback operating state.

With the technology according to the present invention, braking demands can also be carried out without an actuation of the brake actuating element (active pressure buildup).

DETAILED DESCRIPTION

Figure 1:
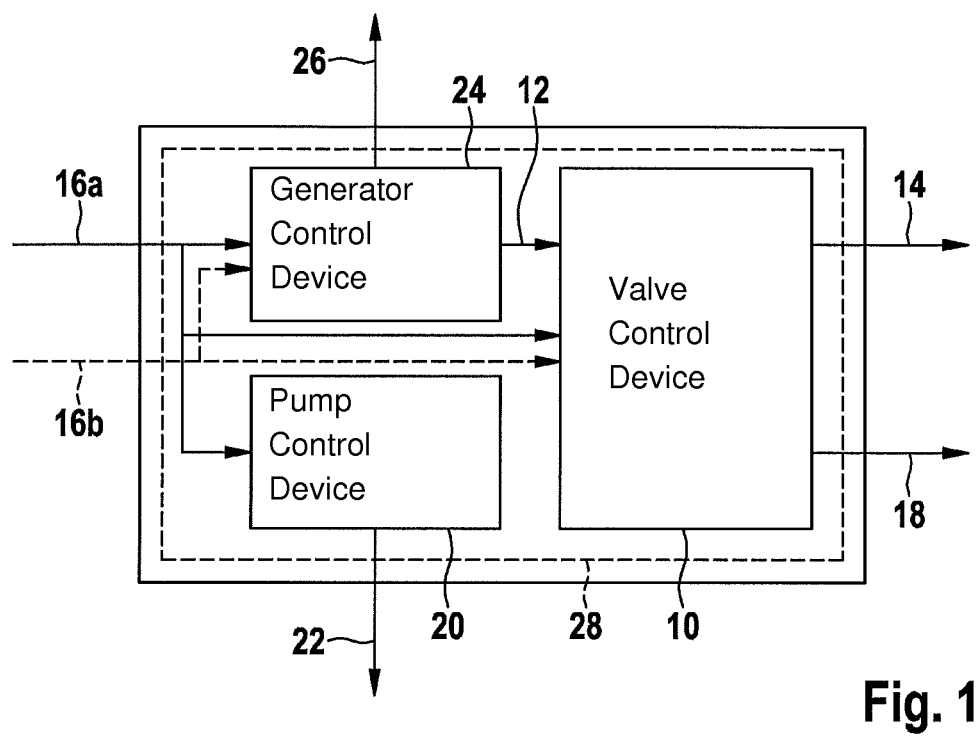
FIG. 1 shows a schematic representation of a specific embodiment of the control device.

FIG. 1 shows a schematic representation of a specific embodiment of the control device.

The form of the control device shown schematically in FIG. 1 can be used in a brake system of a vehicle. The control device has a valve control device 10 that is designed to determine, at least taking into account a provided information signal 12 relating to a generator braking moment of a generator currently being exerted or that is to be exerted, a first target state of a first valve (not shown) of the brake system. The first valve is connected to a master brake cylinder of the brake system and to a fluid storage device of the brake system in such a way that a brake fluid volume can be displaced out of the master brake cylinder into the fluid storage device via the first valve, which is controlled into an at least partly open state.

The first valve can for example be a continuously regulable/adjustable/controllable valve. In particular, as a continuously regulable valve a valve can be used that in addition to a closed state (closed valve mode) can be controlled/regulated into at least two different open states (open valve modes). However, the usability of the control device is not limited to a particular type of continuously regulable valve as first valve.

As fluid storage device, the first valve is connected, via at least one intake line, to a brake medium reservoir of the brake system. The brake medium reservoir can be understood as a fluid storage device that is connected to the master brake cylinder via at least one brake fluid exchange connection, such as for example a compensating bore. Preferably, the brake fluid can be transferred into the brake medium reservoir in pressure-free (counter-pressure-free) fashion. In particular, atmospheric pressure can be present in the brake medium reservoir. An advantageous situation of the first valve at the brake medium reservoir is further described below.

Thus, using valve control device 10 the first target state can be determined for a first valve connected via at least one intake line to the brake medium reservoir of the brake system as fluid storage device. A first control signal 14, corresponding to the first target state, can be outputted to the first valve by valve control device 10.

The (at least one) information signal 12 can be provided to valve control device 10 for example by a vehicle bus, a generator control device, and/or a generator sensor. A further advantageous possibility for providing information signal 12 to valve control device 10 is described in more detail below.

Preferably, valve control device 10 is additionally designed to determine a second target state of a second valve (not shown) of the brake system, taking into account a first sensor signal 16a relating to an actuation strength of an actuation of a brake actuating element of the brake system (by the driver). In this case, the second valve is preferably situated as a separating valve between the master brake cylinder and a brake circuit of the brake system having the first valve and having at least one wheel brake cylinder. A second control signal 18 corresponding to the second target state can be outputted to the second valve by valve control device 10. An advantageous situation of the second valve, usable as separating valve, is further described below. As an alternative, or in addition, to the taking into account of first sensor signal 16a, in the determination of the second target state by valve control device 10 information signal 12, the first target state, and/or a second sensor and/or information signal 16b relating to at least one executable possible generator braking moment, can also be taken into account.

In an advantageous specific embodiment, valve control device 10 is additionally designed to compare first sensor signal 16a to a specified comparison signal with regard to a minimum actuation strength. The minimum actuation strength can be understood as an actuation strength from which a driver's braking force applied to the brake actuating element can be transmitted to a displaceable master brake cylinder piston of the master brake cylinder, such as for example to the piston rod of the master brake cylinder. If the first sensor signal 16a is below the comparison signal (i.e., the actuation strength is below the minimum actuation strength), then in this case valve control device 10 is used to control the second valve into an at least partly open state in such a way that a volume of brake fluid pressed out from the master brake cylinder can be displaced into the brake circuit via the second valve, which is controlled into the at least partly open state. In addition, valve control device 10 can be designed to control, if first sensor signal 16a exceeds the comparison signal (i.e. the actuation strength exceeds the minimum actuation strength), the second valve into a closed state in such a way that a hydraulic connection between the master brake cylinder and the brake circuit is prevented.

The control device can thus be used particularly advantageously with a brake system in which the brake actuating element is situated on the master brake cylinder in such a way that, given an actuation strength of the actuation not equal to zero but below the minimum actuation strength, no driver's braking force can be transmitted to the (at least one) displaceable master brake cylinder piston. As is described in more detail below, in this case a generator can be used to charge a vehicle battery, particularly advantageously during an actuation of the brake actuating element below the minimum actuation strength, in which the driver does not perceive any reaction/counter-force of the brake system at the brake actuating element.

In an advantageous development, the control device includes a pump control device 20 that is designed to output a pump control signal 22 to a pump (not shown) of the brake system when the first sensor signal 16a approaches the comparison signal, given an increase in the actuation strength over time. Through pump control signal 22, the pump can be controlled so as to pump a brake fluid volume out of the brake medium reservoir into the master brake cylinder via the second valve, which is in the at least partly open state. As is explained in more detail below, in this way, after a masking of a generator braking moment, the brake fluid volume previously transferred into the brake medium reservoir can be displaced back into the master brake cylinder by the pump. In this way, it can be ensured that, starting from an actuation strength equal to the minimum actuation strength, the driver will experience a standard brake actuation feeling (pedal feeling) despite the previously executed masking of the generator braking moment.

As an alternative, or in addition to, pump control device 20, the control device can also include a generator control device 24. Using generator control device 24, the generator braking moment of the generator that is to be exerted can be determined taking into account first sensor signal 16a and/or the second sensor and/or information signal 16b relating to the at least one possible generator braking moment that can be executed. Subsequently, a generator control signal 26, corresponding to the determined generator braking moment that is to be exerted, can be outputted to the generator. Likewise, generator control device 24 can output information signal 12 to valve control device 10.

Valve control device 10 can be integrated together with generator control device 24 and/or pump control device 20 into an evaluation electronics 28. In this case, it is no longer necessary to separately provide control devices 10, 20, and 24 with information that is to be evaluated. However, the control device is not limited to the integration of control devices 10, 20, and 24 into an evaluation electronics 28.

The control device can in particular be designed to carry out the method steps of the methods described in more detail below. With regard to the method steps that can be carried out by the control device, reference is therefore made to the following description of the methods.

Further advantages of the control device are described in more detail in the description of its interaction with the components of a brake system, with reference to the following Figure.

FIGS. 2A through 2G show a schematic overall representation, three schematic partial representations, and three coordinate systems for the explanation of a specific embodiment of a brake system having the control device.

Figure 2A:
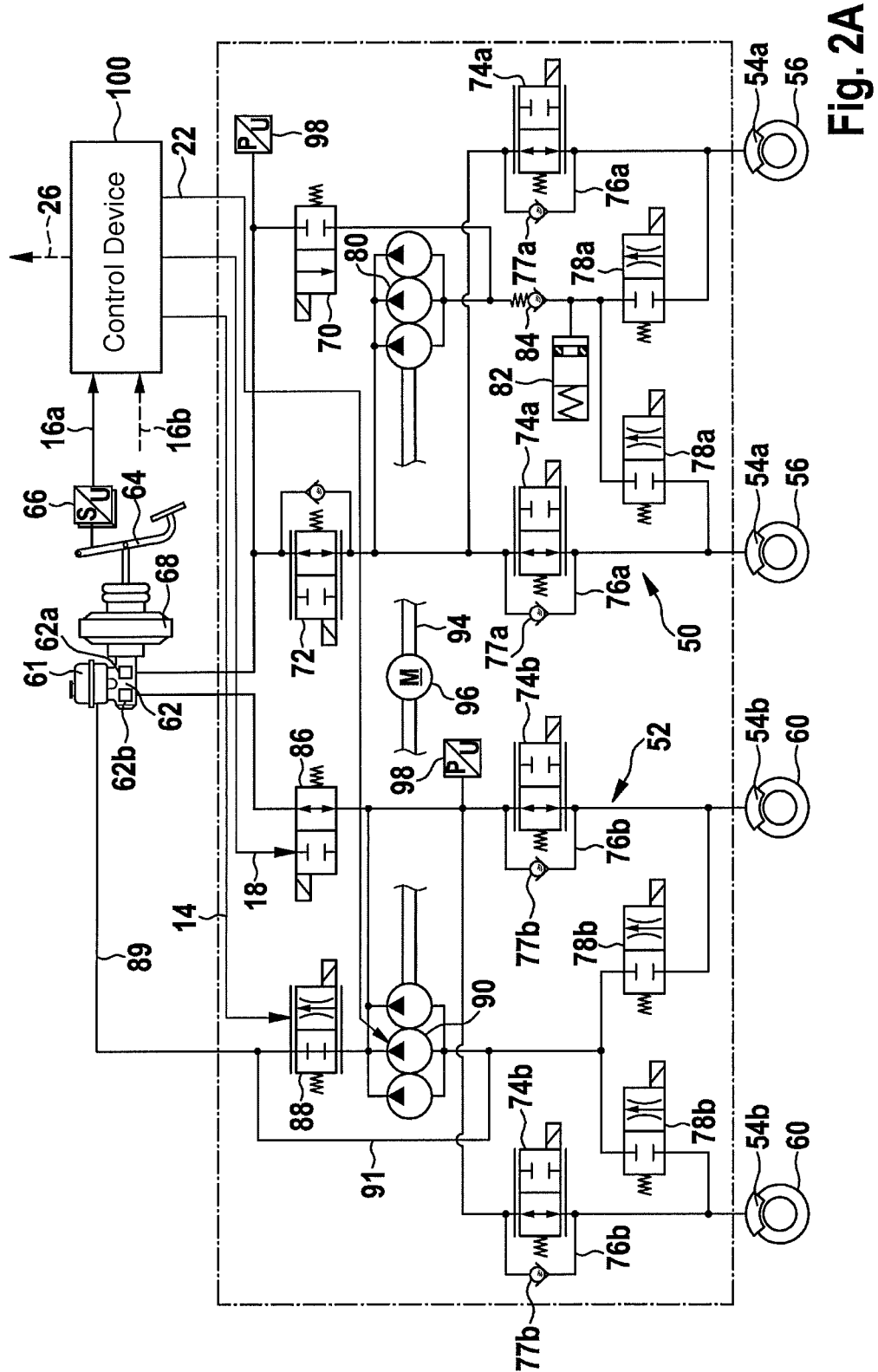
FIGS. 2A-2G show a schematic overall representation, three schematic partial representations, and three coordinate systems explaining a specific embodiment of a brake system having the control device.

FIG. 2A shows a schematic overall representation of a specific embodiment of a brake system having the control device.

The brake system shown schematically in FIG. 2A can be used advantageously for example in a hybrid vehicle and in an electric vehicle. However, the applicability of the brake system described below is not limited to use in a hybrid vehicle or in an electric vehicle.

The brake system has a first brake circuit 50 and a second brake circuit 52, each having two wheel brake cylinders 54a and 54b. Two wheels 56 situated on the front axle are allocated to the two wheel brake cylinders 54a of first brake circuit 50. Wheels 60 on the rear axis are allocated to the two wheel brake cylinders 54b of second brake circuit 52. However, the brake system described here is not limited to a division of the brake circuit according to axles.

The brake system has a master brake cylinder 62, which can be realized for example as a tandem master brake cylinder. Preferably, master brake cylinder 62 has a first displaceable piston, which can be referred to as a piston rod, which extends inward at least partly into a first pressure chamber 62a, allocated to first brake circuit 50, of master brake cylinder 62, and has a second displaceable piston, which can be referred to as a floating piston, which extends inward at least partly into a second pressure chamber 62b, allocated to second brake circuit 52, of master brake cylinder 62. In a preferred specific embodiment, the floating piston can be displaced in such a way that, when there is a displacement of the floating piston in a first direction, the first internal volume of first pressure chamber 62a decreases, while the internal volume of second pressure chamber 62b increases. Correspondingly, via a displacement of the floating piston in a second direction, the internal volume of first pressure chamber 62a can increase when there is a decrease of the internal volume of second pressure chamber 62b. Moreover, a harder spring can be situated in first pressure chamber 62a, so that a (light) actuation of brake actuating element 64 first causes a braking into second pressure chamber 62b and into second brake circuit 52. The advantageous use of a master brake cylinder 62 fashioned in this way is described in more detail below. However, the brake system is not limited to the use of a tandem master brake cylinder, or to a particular design of master brake cylinder 62. Master brake cylinder 62 can be connected to a brake medium reservoir 61 via at least one brake fluid exchange opening, such as for example a compensating bore.

The brake system has a brake actuating element 64, for example a brake pedal, situated on a master brake cylinder 62. Advantageously, brake actuating element 64 is situated on master brake cylinder 62 in such a way that when there is an actuation of brake actuating element 64 with at least a minimum actuation strength, a driver's braking force applied to brake actuating element 64 can be transmitted to a displaceable master brake cylinder piston (not shown) of master brake cylinder 62 in such a way that the master brake cylinder piston can be displaced by the driver's braking force. Preferably, this displacement of the master brake cylinder piston increases an internal pressure in at least one chamber of master brake cylinder 62. In addition, in the brake system described here, brake actuating element 64 is situated on master brake cylinder 62 in such a way that during the actuation of the brake actuating element with an actuation strength not equal to zero but below the minimum actuation strength, a transmission of force between brake actuating element 64 and the master brake cylinder piston is prevented. This ensures the advantage that during the actuation of brake actuating element 64 with the actuation strength less than the minimum actuation strength, the driver is "decoupled" from master brake cylinder 62 and from the at least one brake circuit 50 and 52 connected thereto, and therefore does not detect any reaction of the pressure present therein. The advantageous applicability of this advantage for masking a generator braking moment is described in more detail below. However, the brake system is not limited to such a configuration of brake actuating element 64 on master brake cylinder 62.

Preferably, the brake system also includes a brake actuating element sensor 66 by which the actuation strength of the actuation of brake actuating element 64 by the driver can be determined Brake actuating element sensor 26 can for example include a pedal path sensor, a difference path sensor, and/or a rod path sensor. In order to acquire the actuation strength corresponding to the driver's desired braking, however, a differently designed sensor system may also be used instead of or in addition to the sensor types listed here.

In a preferred specific embodiment, the represented brake system also has a brake force booster 68, such as for example a vacuum brake force booster. Instead of a vacuum brake force booster, the brake system can also have some other type of brake force booster 68, such as for example a hydraulic and/or an electromechanical boosting device. Brake force booster 68 can in particular be a continuously regulable/continuously controllable brake force booster.

Using brake force booster 68, as a rule at least during the actuation of brake actuating element 64 below the minimum actuation strength, the master brake cylinder can be displaced in such a way that a brake fluid volume can be displaced out of master brake cylinder 62. As a rule, a brake force booster 68 has infinite boosting at the beginning of its actuation path. In this region, there exists a negligible (possibly no) mechanical coupling between brake actuating element 64, such as a brake pedal, and the master brake cylinder piston. This can also be referred to as the absence of a significant mechanical coupling between brake actuating element 64 and the brake system. In this region, the driver's braking force will not be used to actuate master brake cylinder 62, i.e. to displace the (at least one) master brake cylinder piston, but rather only to control braking force booster 68.

The beginning of the actuation path, in which the actuation strength not equal to zero is still below the minimum actuation, is therefore often also referred to as the jump-in region. Outside the jump-in region, there exists a mechanical coupling between brake actuating element 64 and the master brake cylinder piston. Outside the jump-in region, the driver's braking force is therefore used for the displacement of the master brake cylinder piston and thus for braking into the at least one wheel brake cylinder 54a and 54b. This process can be supported by the additional force of braking force booster 68.

The characteristic of braking force booster 68 can therefore be used for a braking into master brake cylinder 62 without a (significant) mechanical coupling/transmission of force between brake actuating element 64 and the master brake cylinder piston. Thus, the beginning of the actuation path, with an actuation strength not equal to zero but below the minimum actuation, or the jump-in region, is advantageously usable for a masking of a generator braking moment, as is further explained below.

Figure 2B:
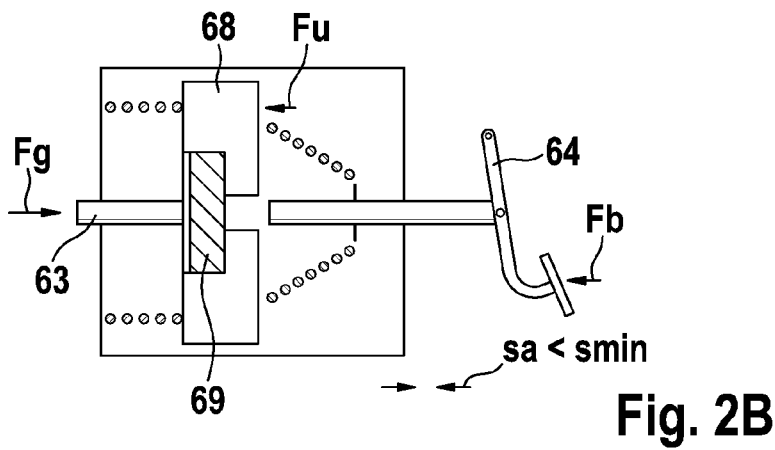
Figure 2C:
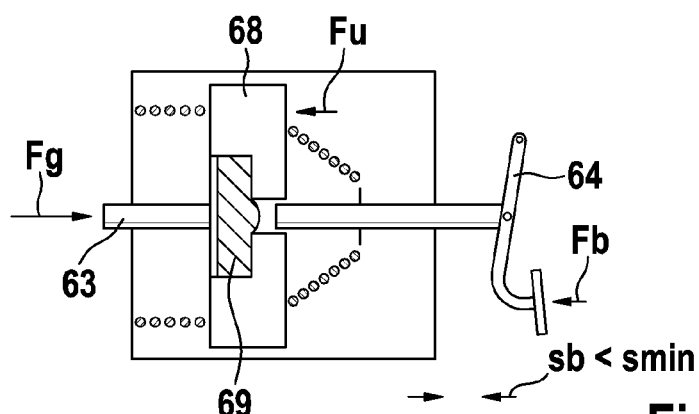
Figure 2D:
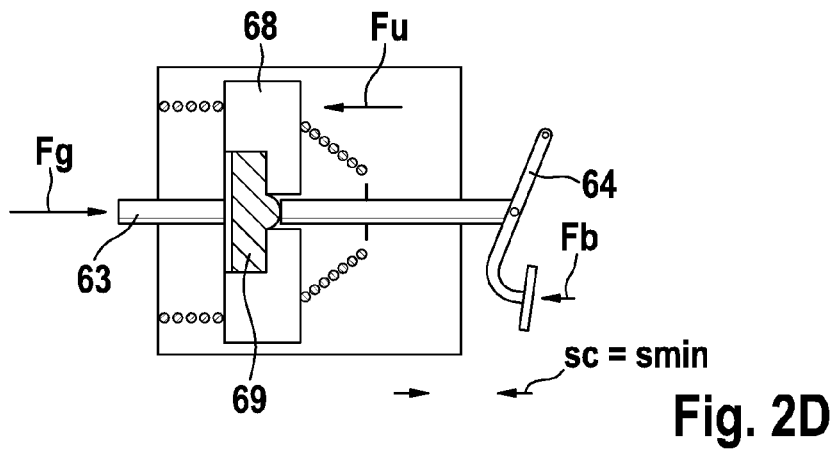

FIGS. 2B through 2D explain the advantageous situation of brake actuating element 64 on master brake cylinder 62:

As can be seen on the basis of FIG. 2B, when there is an actuation strength not equal to zero but below the minimum actuation strength, e.g. given a brake actuation path sa not equal to zero but below a minimum braking path smin, despite a driver's braking force Fb not equal to zero no force transmission connection is present between brake actuating element 64 and the at least one displaceable piston 63 of master brake cylinder 62, such as for example the piston rod. However, a supporting force Fu can be exerted on displaceable piston 63 of master brake cylinder 62 by brake force booster 68. In this way, displaceable piston 63 can be displaced by brake force booster 68 despite the (almost) prevented/absent transmission of force between brake actuating element 64 and displaceable piston 63. Correspondingly, there is an increase in counter-force Fg, which counteracts the inward displacement of displaceable piston 63. However, due to the (almost) prevented transmission of force between brake actuating element 64 and displaceable piston 63 when there is an actuation below the minimum actuation strength, the driver will not perceive counter-force Fg (regardless of its magnitude).

In the situation shown in FIG. 2C, brake actuation path sb is still below the minimum braking path. Correspondingly, during the actuation of brake actuating element 64 the driver will not perceive counter-force Fg, which is increased in comparison with FIG. 2B.

Only starting from an actuation strength equal to the minimum actuation strength, e.g. given a brake actuation path sc equal to minimum brake path smin, is there a force transmission contact between brake actuating element 64 and the (at least one) displaceable piston 63 of master brake cylinder 62, as shown in FIG. 2D. The force transmission contact can for example run via an elastic element, such as in particular a reaction disk 69.

Figure 2E:
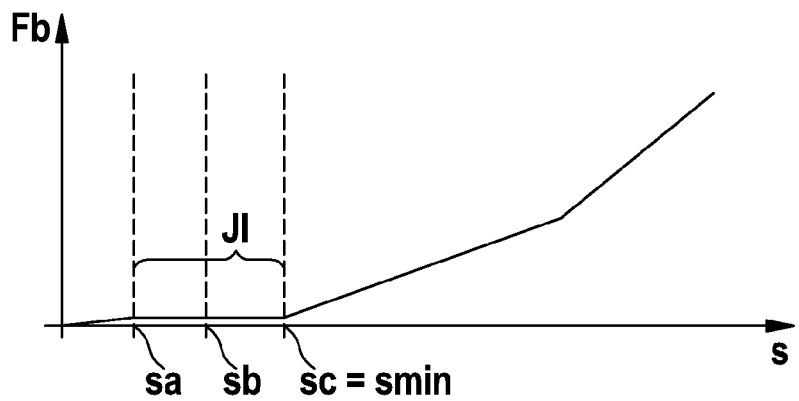
Figure 2F:
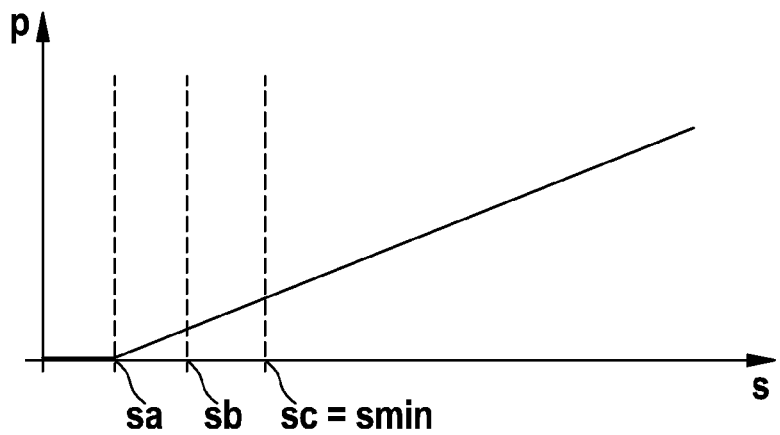
Figure 2G:
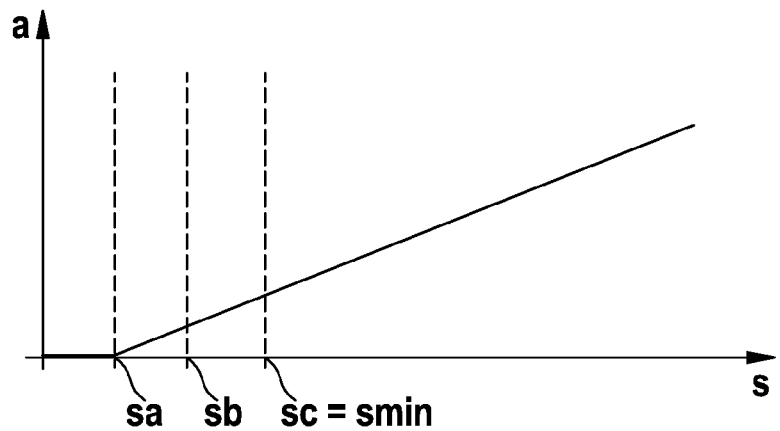

FIGS. 2E through 2G each show a coordinate system explaining the advantages of the preferred situation of brake actuating element 64 on master brake cylinder 62. In the coordinate systems of FIGS. 2E through 2G, the abscissas are brake actuating path s, shown as actuation strength. In FIG. 2E, the ordinate indicates the associated driver's braking force Fb. The ordinate of FIG. 2F indicates pressure p present in master brake cylinder 62 given a brake actuation path s. Vehicle slowing a, executed given a brake actuation path s, can be seen on the basis of the ordinate in FIG. 2G.

As can be seen in FIG. 2E, due to the advantageous situation of the brake actuating element on master brake cylinder 62, an actuation region that can be designated jump-in region JI is ensured. Within jump-in region JI, the driver can displace brake actuating element 64 with a (nearly) constant driver's braking force Fb.

During jump-in region JI, the driver brakes only indirectly into master brake cylinder 62. This can be realized by using a brake actuating element sensor to determine a vehicle slowing a, corresponding to brake actuation path s, as the target vehicle slowing (see FIG. 2G). Subsequently, using brake force booster 68, pressure p in master brake cylinder 62 can be set corresponding to the determined vehicle slowing a/target vehicle slowing (see FIG. 2F). This can also be described by saying that the driver brakes into master brake cylinder 62 in path-controlled fashion.

In the following, further components of the specific embodiment of the brake system are described with reference to FIG. 2A. It is expressly noted here that the components of the brake system described below represent only an example of a possible embodiment of the advantageous brake system. Above all, an advantage of the brake system is that brake circuits 50 and 52 are not committed to a particular realization or to the use of particular components. Instead, brake circuits 50 and 52 can be modified with a high degree of elective freedom, without impairing the advantages of the specific embodiment of the brake system.

First brake circuit 50 is fashioned having a main switching valve 70 and a changeover valve 72 in such a way that the driver can brake directly into wheel brake cylinders 54a of first brake circuit 50 via master brake cylinder 62. Each of the two wheel brake cylinders 54a of first brake circuit 50 have allocated to them a wheel inlet valve 74a having a bypass line 76a running parallel thereto, a check valve 77a situated in each bypass line 76a, and a wheel outlet valve 78a. Moreover, first brake circuit 50 has a first pump 80 whose intake side is connected to wheel outlet valves 78a and whose conveying side is directed toward changeover valve 72, a storage chamber 82 coupled between wheel outlet valves 78a and pump 80, and a pressure relief valve 84 situated between first pump 80 and storage chamber 82.

Second brake circuit 52 is fashioned as a brake circuit 52 that can be decoupled from master brake cylinder 62. For this purpose, second brake circuit 52 has (as second valve) a separating valve 86 by which wheel brake cylinders 54b of second brake circuit 52, wheel inlet valves 74b allocated to wheel brake cylinders 54b with parallel-situated bypass lines 76b having check valves 77b, and wheel outlet valves 78b allocated to wheel brake cylinders 54b can be decoupled from master brake cylinder 62. Via a closing of separating valve 86, the brake pressure in wheel brake cylinders 54b of second brake circuit 52 can be prevented from corresponding to the internal pressure present in second pressure chamber 62b of master brake cylinder 62.

Moreover, second brake circuit 52 has a continuously regulable/displaceable/controllable valve 88 (usable as first valve) and a second pump 90. Instead of continuously regulable valve 88, second brake circuit 52 can however also have a switching valve as first valve 88. Continuously regulable valve 88 is hydraulically connected, via an intake line 89, to brake medium reservoir 61 on master brake cylinder 62. The intake side of second pump 90 is likewise hydraulically connected to brake medium reservoir 61, via a line 91 running parallel to continuously regulable valve 88 and second pump 90, and via reservoir line 89, in such a way that after a closing of separating valve 86 a brake fluid volume can be pumped into wheel brake cylinders 54b of second brake circuit 52 by second pump 90 via the (at least partly open) wheel inlet valves 74b. The conveying side of second pump 90 is connected to brake medium reservoir 61 via continuously regulable valve 88 in such a way that after the closing of separating valve 86 a brake fluid volume can be pumped out of wheel brake cylinders 54b of second brake circuit 52 into brake medium reservoir 61, via the (at least partly open) wheel outlet valves 78b and the (at least partly open) continuously regulable valve 88.

Thus, after the closing of separating valve 86, the hydraulic braking moment of wheel brake cylinders 54b of second brake circuit 52 can be actively adjusted using second pump 90 and continuously regulable valve 88. In particular, the hydraulic braking moment of wheel brake cylinders 54b of second brake circuit 52, decoupled from master brake cylinder 62, can be set corresponding to a difference between a target overall braking moment, specified by the driver, and an actual overall braking moment, from the generator braking moment of the generator and the hydraulic braking moment of wheel brake cylinders 54a of first brake circuit 50.

The brake system shown in FIG. 2A can therefore be designated a "partly decoupled brake system." In particular, an axle allocated to second brake circuit 52 is "decouplable" from master brake cylinder 62. In contrast, the axle allocated to first brake circuit 50 is constantly "coupled/connected" to master brake cylinder 62 (as in a standard brake system).

Pumps 80 and 90 can each be allocated to a common shaft 94 of an engine 96, as three-piston pumps. However, instead of three-piston pumps, other pump types can also be used for pumps 80 and 90. Moreover, each of the two brake circuits 50 and 52 can additionally include at least one pressure sensor 98.

Components 70 through 96 of the brake system described in the above paragraphs merely represent examples of an equipping of a brake system equipped with control device 100, described in more detail below.

Through the use of the above-described control device 100 with the brake system, a comparatively high efficiency can be achieved during recuperation:

By a switching of continuously regulable valve 88 through first control signal 14, a brake fluid volume pressed out of master brake cylinder 62 can optionally be displaced into wheel brake cylinders 54b of second brake circuit 52, or into brake medium reservoir 61. This can also be described as saying that a "hydraulic free travel" can be realized by controlling continuously regulable valve 88 through first control signal 14. The activation of the "hydraulic free travel" by opening continuously regulable valve 88 brings about (due to the lower counter-pressure in brake medium reservoir 61 compared with wheel brake cylinders 54b of second brake circuit 52) the displacement of the brake fluid volume pressed out from master brake cylinder 62 into brake medium reservoir 61. In this case, there takes place no significant pressure buildup in master brake cylinder 62. Instead, volume is displaced into brake medium reservoir 61 by a minimal pressure. This pressure is so low (0.0× bar) that wheel brake cylinders 54a and 54b (brake calipers) are still significantly below their response pressure.

Due to the lower counter-pressure in brake medium reservoir 61 in relation to wheel brake cylinders 54a of first brake circuit 50, and the advantageous displaceability of the floating piston, the "hydraulic free travel" also causes a prevention of hydraulic pressure buildup in first brake circuit 50. The switching of continuously regulable valve 88 by first control signal 14 therefore ensures that when there is a (light) actuation of brake actuating element 64, the brake pressure in wheel brake cylinders 54a and 54b of the two brake circuits 50 and 52 is not increased.

Nonetheless, via sensor 66 a desired braking on the part of the driver can be reliably determined and can then be implemented via the generator with very high efficiency (completely or partly). The generator (not shown) can for example be situated on the front axle. In this way, a vehicle battery can be charged by the generator without exceeding the desired braking specified by the driver.

To the extent that the current generator power cannot bring about this slowing alone, a controlling of continuously regulable valve 88 and of second pump 90 can build up an additional hydraulic braking moment in the two wheel brake cylinders 54b in order to at least partly correspond to the desired slowing specified by the driver. Preferably, in this case the sum of the hydraulic braking moments and the generator braking moment can be equal to the desired slowing specified by the driver. Continuously regulable valve 88 can be controlled/switched in a targeted manner by first control signal 14 in such a way that, via a displacement of the brake fluid volume pressed out from master brake cylinder 62 into brake medium reservoir 61 via the at least partly open continuously regulable valve 88, the preferred hydraulic braking moment of wheel brake cylinders 54b is present. With regard to the precise switching strategy, reference is made to the method steps described below.

The "hydraulic free travel" that can be brought about by controlling continuously regulable valve 88 through first control signal 14 thus ensures the advantages of a "mechanical" free travel. Thus, it is not necessary to form a "mechanical" free travel at master brake cylinder 62, at brake force booster 68, or at brake actuating element 64.

The brake system equipped with control device 100 can in particular also carry out the method steps described in the following. With regard to the realization of these method steps and their advantages, reference is therefore made to the description of the further Figures.

Figure 3:
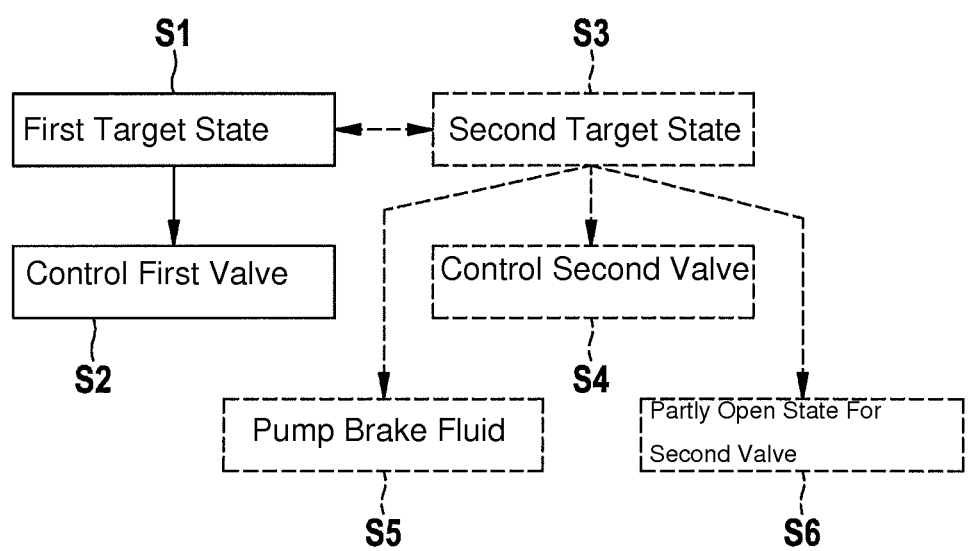
FIG. 3 shows a flow diagram representing a first specific embodiment of the method.

FIG. 3 shows a flow diagram representing a first specific embodiment of the method.

The method represented in FIG. 3 is for example realizable by the above-described control device, or the brake system equipped therewith. However, the realizability of the method is not limited to the use of this control device or of the brake system equipped therewith.

In a method step S1, a first target state of a first valve of the brake system is determined, taking into account a generator braking moment quantity with regard to a generator braking moment of a generator currently being exerted or that is to be exerted. The first valve is connected to a master brake cylinder of the brake system and to a fluid storage device of the brake system in such a way that a brake fluid volume can be displaced from the master brake cylinder into the fluid storage device via the first valve, controlled into an at least partly open state. The first valve can in particular be a continuously regulable/controllable/adjustable valve. The method described here is however not limited to the use of a continuously regulable valve as first valve.

As fluid storage device, the first valve is connected to a fluid medium reservoir of the brake system at least via an intake line. More precise descriptions concerning the possible realization of the brake medium reservoir are described above.

For example, in method step S1 the generator braking moment quantity is compared with a specified minimum braking moment quantity. If the generator braking moment quantity is above the minimum braking moment quantity, the first valve is preferably controlled into the at least partly open state in such a way that a brake fluid volume pressed out from the master brake cylinder is displaced into the brake medium reservoir via the first valve controlled into the at least partly open state. Likewise, if the generator braking moment quantity is below the minimum braking moment quantity, the first valve can be controlled into a closed state in such a way that a hydraulic connection between the master brake cylinder and the brake medium reservoir is prevented.

In a method step S2, the first valve is controlled taking into account the determined first target state. For example, through the brake fluid volume displaced in this way into the brake medium reservoir, the brake fluid volume pressed out from the master brake cylinder can be prevented from contributing to an increase in a hydraulic braking moment of at least one wheel brake cylinder. Thus, a "hydraulic free travel" can be realized by controlling the first valve, which prevents an actuation of a brake actuating element situated on the master brake cylinder from automatically causing an increase in the brake pressure of the at least one wheel brake cylinder of the brake system.

In an optional method step S3, a second target state of a second valve of the brake system can be determined taking into account an actuation strength quantity relating to an actuation strength of an actuation of a brake actuating element. Instead of or in addition to the actuation strength quantity, the generator braking moment quantity, the first target state, and/or an item of generator initiation information relating to at least one executable possible generator braking moment can also be taken into account. (The item of generator initiation information is for example provided by at least one sensor situated on the generator and/or on a battery that can be charged by the generator, and/or by a vehicle bus.) Here, the second target state is determined for a separating valve, used as a second valve, between the master brake cylinder and a brake circuit of the brake system having the first valve and having at least one wheel brake cylinder. In a subsequent method step S4, this second valve is controlled as a separating valve, taking into account the determined second target state.

Preferably, in method step S3 the actuation strength quantity is compared with a minimum actuation strength quantity relating to a minimum actuation strength beginning from which a driver's braking force applied to a brake actuating element is transmitted to a displaceable master brake cylinder piston of the master brake cylinder. If the actuation strength quantity is below the minimum actuation strength quantity, then in this case the second valve is controlled into an at least partly open state in such a way that a brake fluid volume pressed out from the master brake cylinder is displaced into the brake circuit via the second valve controlled into the at least partly open state. As soon as the actuation strength quantity exceeds the minimum actuation strength quantity, the second valve can be controlled into a closed state in such a way that a hydraulic connection between the master brake cylinder and the brake circuit is prevented.

Thus, by method steps S3 and S4 the brake circuit having the first valve and the at least one wheel brake cylinder can optionally be hydraulically connected to the master brake cylinder or hydraulically separated therefrom. If the brake circuit is hydraulically connected to the master brake cylinder, the driver can brake directly into the master brake cylinder. In contrast, the brake pressure present in a hydraulically disengaged brake circuit can be adjusted independently of a pressure in the master brake cylinder. The setting of the brake pressure in the brake circuit can in particular take place using the first valve.

In the preferred embodiment of method step S3, it is ensured that the brake circuit is hydraulically disengaged from the master brake cylinder, while the driver does not perceive any counter-force, corresponding to the pressure in the master brake cylinder, when actuating the brake actuating element, due to the (almost) prevented transmission of force between the master brake cylinder and the brake actuating element. Thus, the driver also does not notice, as a result of a changed brake actuation feeling (pedal feeling), the hydraulic decoupling/separation of the brake circuit from the master brake cylinder through the closing of the second valve used as separating valve.

This advantage can also be described as being that for the masking of a generator braking moment by the hydraulically decouplable/separable brake circuit, the jump-in region is used, in which the driver does not notice the decoupling/separation of the brake circuit via a changed counter-force at the brake actuating element.

If, given an increase over time of the actuation strength quantity, the actuation strength quantity is going toward the minimum actuation strength quantity, then a method step S5 can preferably be carried out. In method step S5, a pump of the brake system pumps a brake fluid volume out of the brake medium reservoir into the master brake cylinder via the second valve present in the at least partly open state.

Likewise, if, given a decrease over time in the actuation strength quantity, the actuation strength quantity is going toward the minimum actuation strength quantity, then a method step S6 can be carried out. In method step S6, the second valve is controlled into the at least partly open state in such a way that a brake fluid volume is transferred out of the brake medium reservoir into the master brake cylinder via the second valve, which is in the at least partly open state.

The advantages of an execution of method steps S5 and S6 are explained in more detail on the basis of the following coordinate systems.

The designation of method steps S1 through S6 does not imply a commitment to any temporal sequence for their execution.

Figure 4A:
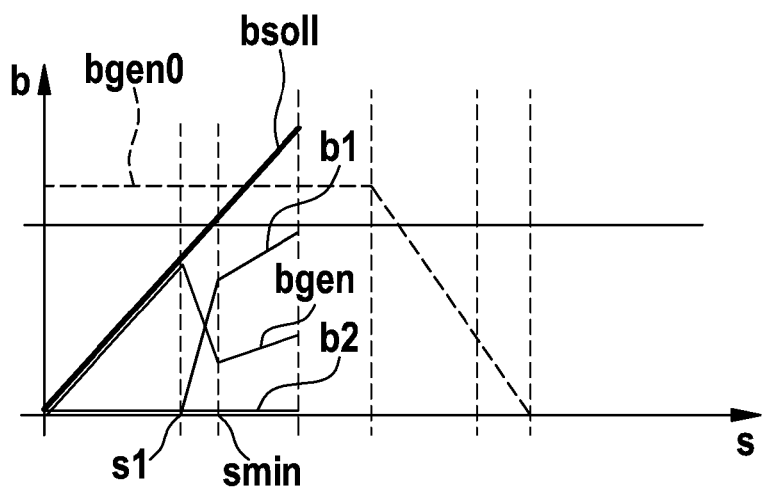
FIGS. 4A-4D show four coordinate systems representing a second specific embodiment of the method.
Figure 4B:
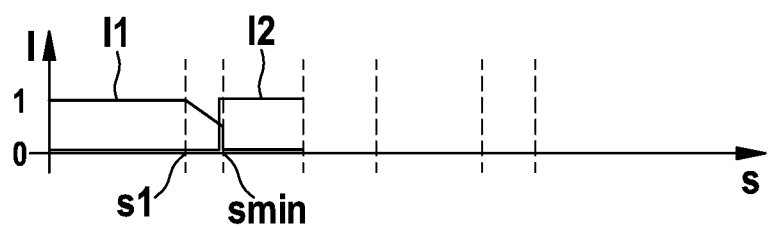
Figure 4C:
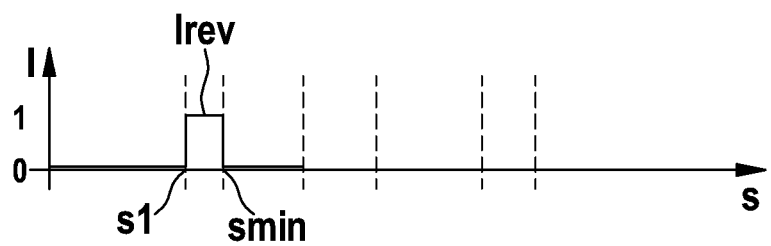
Figure 4D:
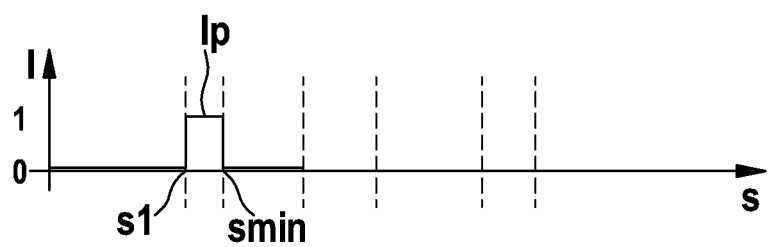

FIGS. 4A through 4D show four coordinate systems representing a second specific embodiment of the method. The abscissas of the coordinate systems of FIGS. 4A through 4D reproduce a brake actuation path s as an example of an actuation strength. In FIG. 4A, the ordinate is a braking moment b. The ordinates of FIGS. 4B through 4D are current strengths I of supply currents/control currents provided to various components of the controlled/operated brake system.

For better clarity, the method stated below is used for the operation of the above-described brake system. It is to be noted that the realization of the method is however not limited to the use of the above-described brake system, or of the control device used therein. In particular, instead of the continuously regulable valve a different type of valve can also be used as first valve.

The method is executed in order to charge a battery using the generator, at least in the case of a brake actuation path s that is not equal to zero but is below a minimum brake path smin below which a transmission of force between the brake actuating element and the master brake cylinder is (at least significantly) prevented. If a possible generator braking moment bgen0 not equal to zero can be executed (see FIG. 4A), then, given a brake actuation path s smaller than a first boundary path s1, which is smaller than or equal to minimum braking path smin, the continuously regulable valve controlled as first valve is controlled into an at least partly open state. If the continuously regulable first valve is realized as a currentlessly closed valve, then for this purpose a first current strength I1 not equal to zero is provided to the first valve, as shown in FIG. 4B.

In addition, given a brake actuation path s smaller than a first boundary path s1, the second valve, used as separating valve, is also controlled into an at least partly open state. Preferably, the second valve is fashioned as a currentlessly open valve. In this case, a second current strength I2, equal to zero, can be provided to the second valve in order to advantageously control it.

On the basis of the advantageous controlling of the two valves by current strengths I1 and I2, during the actuation of the brake actuating element with a brake actuation path s smaller than a first boundary path s1 the brake force booster displaces a brake fluid volume out of the second pressure chamber, connected to the second valve, of the master brake cylinder into the brake medium reservoir, via the controlled valves. Because the breakaway moment of the wheel brake cylinders of the separable second brake circuit is higher than the pressure in the brake medium reservoir, which as a rule is equal to atmospheric pressure, no brake fluid is displaced into the wheel brake cylinders of the second brake circuit. Thus, it is not necessary to close the wheel inlet valves of the second brake circuit. Preferably, the wheel inlet valves of the second brake circuit are fashioned as currentlessly open valves. In this case, given a brake actuation path s smaller than a first boundary path s1, a wheel inlet valve current strength Irev equal to zero can be provided to these valves, as shown in FIG. 4C. Because a functioning of the pump of the separable brake circuit is not required in the case of a brake actuation path s less than first boundary path s1, the pump current strength Ip provided to the pump can also be equal to zero (see FIG. 4D).

At the same time, via the above-described advantageous design of the master brake cylinder it can be ensured that, in the case of a brake actuation path s less than first boundary path s1, the floating piston is displaced in such a way that no pressure is built up in the first pressure chamber, hydraulically connected to the non-decouplable first brake circuit, of the master brake cylinder. For this purpose, the floating piston is displaced in the direction of the second pressure chamber. In this way it can be brought about that no brake fluid volume is displaced into the wheel brake cylinders, allocated to the first pressure chamber of the master brake cylinder, of the first brake circuit.

In the case of a brake actuation path s that is between zero and first boundary path s1, braking moment b1 of the wheel brake cylinders of the first brake circuit (of the non-separable/non-decouplable brake circuit) and braking moment b2 of the wheel brake cylinders of the second brake circuit (of the separable/decouplable brake circuit) can be set to values equal to zero despite the open wheel inlet valves, as can be seen in FIG. 4A. Moreover, given a brake actuation path s that is between zero and first boundary path s1, a target overall braking moment bsoll, corresponding to brake actuation path s, can be determined by a sensor and an evaluation device. If possible generator braking moment bgen0 permits it, the generator can be controlled so as to exert a generator braking moment bgen (regenerative braking moment) corresponding to target overall braking moment bsoll. (Possible generator braking moment bgen0 is for example provided by at least one sensor situated on the generator and/or on a battery that can be charged by the generator, and/or by a vehicle bus.)

Target overall braking moment bsoll requested by the driver is in this case applied 100% as generator braking moment bgen. For example, the generator can apply generator braking moment bgen to an axle allocated to the non-separable first braking circuit, such as in particular the front axle.

Beginning from first boundary path s1, brake actuation path s approaches minimum braking path smin as time increases. In this situation, the braking system can be prepared for a sudden departure from the jump-in region. Because the departure from the jump-in region is associated with a standard pedal feeling for the driver, the brake pressure in the non-separable first brake circuit is set to a value corresponding to minimum brake path smin. For further operation of the generator in order to charge the battery, second hydraulic braking moment b2 of the separable second brake circuit can at the same time be kept equal to zero. For this purpose, the wheel inlet valves of the second brake circuit are closed. This can take place through provision of a wheel inlet valve current strength Irev not equal to zero.

In order to set a desired brake pressure in the non-separable first brake circuit, the second pump of the second brake circuit is controlled with a pump supply current Ip not equal to zero. Given an open second valve, in this way a brake fluid volume is conveyed, by the second pump, from the brake medium reservoir into the second pressure chamber of the master brake cylinder, via the intake line and the open second valve. The pressure in the second pressure chamber of the master brake cylinder can be set by the first valve, i.e. by a varying first current strength I1, in such a way that the desired pressure is present in the first pressure chamber through a displacement of the floating piston partially out of the second pressure chamber into the first pressure chamber. In this way, the brake pressure in the non-decouplable first brake circuit is set by the first valve in such a way that the desired hydraulic braking moment b1, not equal to zero, is present in the wheel brake cylinders of the first brake circuit. The goal of this controlling is to convey a brake fluid volume corresponding to the desired first hydraulic braking moment b1 into the first brake circuit when the jump-in (the boundary of the jump-in region) has been reached. It is again to be noted that this volume is suctioned out from the brake medium reservoir and is conveyed into the second pressure chamber of the master brake cylinder via the open second valve.

While first hydraulic braking moment b1 increases starting from first boundary path s1, no pressure buildup takes place in the wheel brake cylinders of the separable second brake circuit due to the closed wheel inlet valves of the second brake circuit. Second hydraulic braking moment b2 of the wheel brake cylinders of the second brake circuit thus remains equal to zero (see FIG. 4A).

At the same time, generator braking moment bgen can be reduced/brought down corresponding to the increase over time of first hydraulic braking moment b1. Thus, a target overall braking moment bsoll corresponding to brake actuation path s can also be maintained in the case of a brake actuation path s that is between first brake actuation path s1 and minimum brake path smin.

Starting from a brake actuation path s equal to minimum brake path smin, the second valve is closed by a supply current having a second current strength I2 not equal to zero. The second brake circuit is thus hydraulically separated/decoupled from the master brake cylinder, beginning from a brake actuation path s that is equal to minimum brake path smin. This can also be described by saying that the brake system is now in brake-by-wire mode. However, given an increase in brake actuation path s over time, the driver further has the possibility of braking directly into the first braking circuit, and in this way increasing first hydraulic braking moment b1. Generator braking moment bgen can also be increased corresponding to a desired target overall braking moment bsoll, if possible generator braking moment bgen0 permits this. Thus, regenerative braking and masking can also take place outside the jump-in region. This can take place in a strategy corresponding to the installed brake force distribution. Alternatively, of course, other strategies for brake force distribution are conceivable, such as a theoretical overbraking of the axle of the decouplable second brake circuit in order to increase the recuperative efficiency.

Second hydraulic braking moment b2 of the second brake circuit can be kept constantly equal to zero. For this purpose, the first valve can be closed and the wheel inlet valves can be opened by providing these with current strengths I1 and Irev equal to zero. Because a functioning of the second pump is not required in this system state, pump current strength Ip can also be set equal to zero.

Figure 5A:
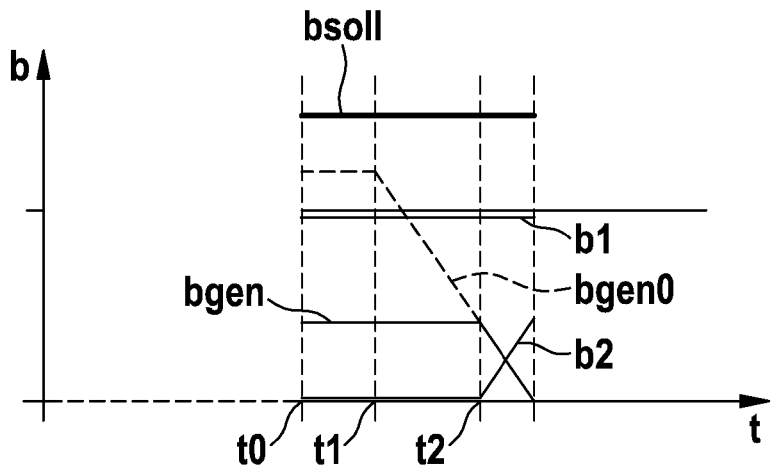
FIGS. 5A-5D show four coordinate systems explaining a third specific embodiment of the method.
Figure 5B:
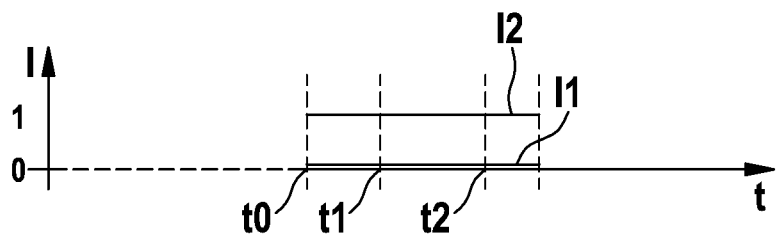
Figure 5C:
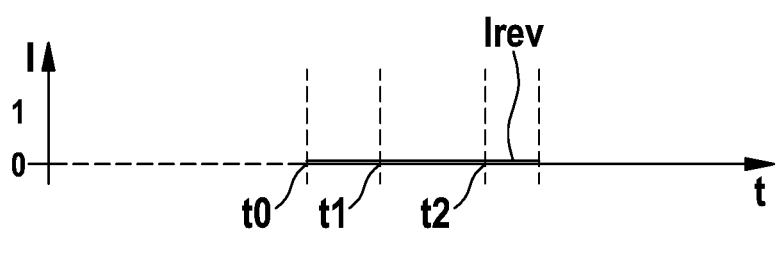
Figure 5D:
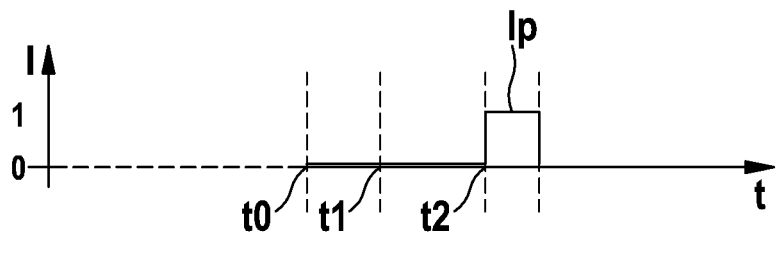

FIGS. 5A through 5D show four coordinate systems explaining a third specific embodiment of the method. The abscissa of the coordinate systems of FIGS. 5A through 5D is time axis t. The ordinate of FIG. 5A corresponds to a braking moment b. The ordinates of FIGS. 5B through 5D are current strengths I of supply currents provided to the components listed above of the operated brake system.

During the presented method, the driver brakes with a (constant) brake actuation path s greater than minimum braking path smin. The method of FIGS. 5A through 5D can for example be carried out according to the method described above.

Up to a time t2, the executable possible generator braking moment bgen0 is greater than executed generator braking moment bgen. Thus, between times t0 and t2, the values set at the end of the method of the above-described Figures for target overall braking moment bsoll, generator braking moment bgen, first hydraulic braking moment b1, second hydraulic braking moment b2, first current strength I1, second current strength I2, wheel inlet valve current strength Irev, and pump current strength Ip can be maintained.

Beginning from time t1, possible generator braking moment bgen0 decreases with time. The decrease over time of possible generator braking moment bgen0 can for example be due to the fact that the vehicle now has only a low speed, and/or the rechargeable battery is already almost completely charged. Both factors permit only a limited generator braking moment bgen.

Beginning from time t0, previously set generator braking moment bgen can no longer be carried out, due to the decrease over time of possible generator braking moment bgen0. However, target overall braking moment bsoll, corresponding to the (constant) brake actuation path s, can still be reliably maintained despite the strong decrease over time of generator braking moment bgen. For this purpose, second hydraulic braking moment b2 can be increased via a hydraulic pressure buildup in the decouplable second braking circuit. The decrease over time of the possible generator braking moment is therefore not associated with a loss of comfort for the driver.

The pressure buildup in the second brake circuit can be carried out via a controlling of the second pump with a pump current strength Ip not equal to zero. During the pressure buildup, the first valve and the second valve remain closed, and the wheel inlet valves of the decouplable second brake circuit remain open. For this purpose, a first current strength I1 equal to zero is provided to the first valve, a second current strength I2 not equal to zero is provided to the second valve, and a wheel inlet valve current strength Irev equal to zero is provided to the wheel inlet valves.

Ideally, the pressure buildup in the second brake circuit takes place corresponding to the installed brake force distribution, because then conditions prevail identical to the standard system. However, other strategies are also conceivable; e.g. an overbraking of the axle of the second brake circuit can be provided in order to increase the recuperative efficiency.

Figure 6A:
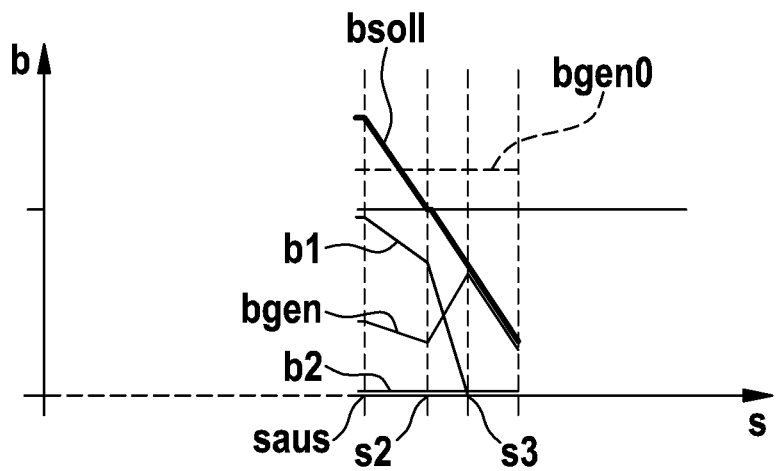
FIGS. 6A-6D show four coordinate systems explaining a fourth specific embodiment of the method.
Figure 6B:
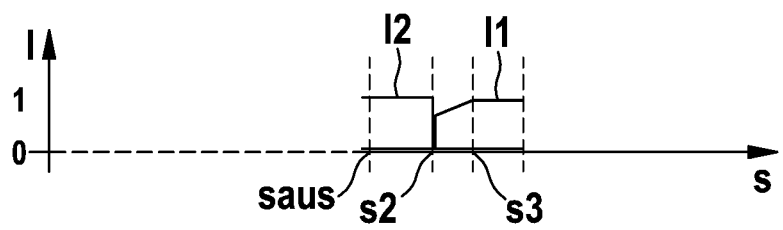
Figure 6C:
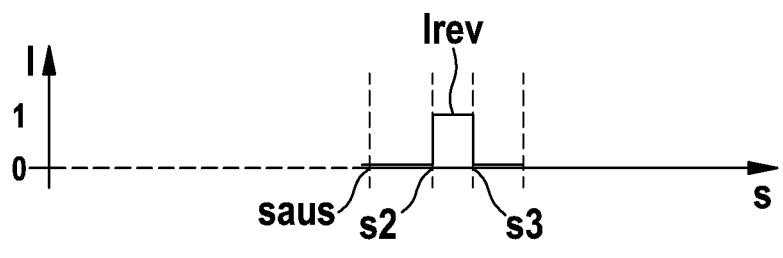
Figure 6D:
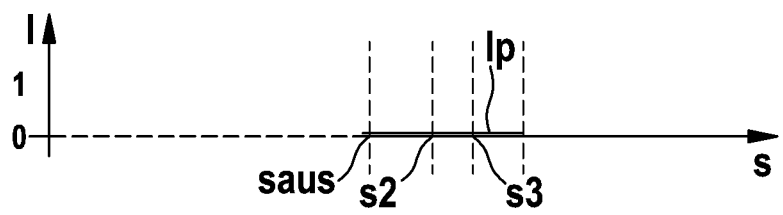

FIGS. 6A through 6D show four coordinate systems for the explanation of a fourth specific embodiment of the method. The abscissas of the coordinate systems of FIGS. 6A through 6D reproduce a brake actuation path s. In FIG. 6A, the ordinate is a braking moment b. The ordinates of FIGS. 6B through 6D are current strengths I of supply currents provided to the components of the operated brake system.

In the method schematically reproduced on the basis of FIGS. 6A through 6D, brake actuation path s decreases constantly over time, beginning from an initial brake path saus greater than minimum brake path smin. The method described here can for example be carried out according to at least one of the methods described above. At the beginning of the method, the values for target overall braking moment bsoll, generator braking moment bgen, first hydraulic braking moment b1, second hydraulic braking moment b2, first current strength I1, second current strength I2, wheel inlet valve current strength Irev, and pump current strength Ip can be equal to the end values of the method of FIGS. 4A through 4D.

With the decrease over time of brake actuation path s, a target overall braking moment bsoll is also determined that decreases over time. Due to the decreasing brake actuation path s, first hydraulic braking moment b1 of the non-decouplable first braking circuit, in which the driver brakes directly, also decreases over time. At the same time, the generator can be controlled in such a way that the desired target overall braking moment bsoll is reliably maintained by a decrease over time of generator braking moment bgen. At the same time, second hydraulic braking moment b2 of the wheel brake cylinders of the second brake circuit, which is hydraulically separated/decoupled from the master brake cylinder, can have a value of zero. The first valve and the second valve can be in the closed state, due to a first current strength I1 equal to zero and a second current strength I2 not equal to zero. The wheel inlet valves of the decouplable second brake circuit can be controlled into the open state by a wheel inlet valve current strength Irev equal to zero. Because a functioning of the second pump of the decouplable second brake circuit is not required in the case of a brake actuation path s, between initial brake path saus and a second boundary path s2, that decreases over time, in this case pump current strength Ip can be equal to zero.

Starting from a brake actuation path s equal to second boundary path s2, which is preferably equal to minimum brake path smin, generator braking moment bgen is set to a value corresponding to the (theoretical) braking moment of the decouplable second brake circuit. In this way, it can be ensured that a return can always be made to the predefined hydraulic brake force distribution, despite a masking.

During the increase of generator braking moment bgen, the first hydraulic braking moment b1 of the non-decouplable first brake circuit is reduced. This takes place via a volume displacement from the master brake cylinder into the brake medium reservoir, via the decouplable second brake circuit. For this purpose, the second valve is opened using a second current strength I2 equal to zero. Via a controlling of the first valve with a varying current strength I1 not equal to zero, a brake fluid volume can be displaced out of the second pressure chamber of the master brake cylinder into the brake medium reservoir, via the open second valve and the at least partly open first valve. Here, the floating piston is also displaced away from the first pressure chamber, in the direction of the second pressure chamber of the master brake cylinder. The enlargement brought about in this way of the first pressure chamber causes a dismantling of pressure in the non-decouplable first brake circuit, and thus to a reduction of first hydraulic braking moment b1 of the wheel brake cylinders of the first brake circuit.

During the procedure described in the preceding paragraph, the wheel inlet valves of the second brake circuit can be closed by a wheel inlet valve current strength Irev not equal to zero, in order to keep the second hydraulic braking moment b2 of the wheel brake cylinders of the second brake circuit equal to zero despite the displacement of the brake fluid volume. Because the use of the second pump of the decouplable second brake circuit is not required for the displacement of the brake fluid volume, pump current strength Ip can remain equal to zero.

Starting from a brake actuation path s3 that can in particular be smaller than minimum brake path s, a first hydraulic braking moment b1 equal to zero is present. Corresponding to the further decrease over time of brake actuation path s, a temporally reduced target overall braking moment bsoll can be determined that, if possible generator braking moment bgen0 permits it, is applied solely through a generator braking moment bgen equal to target overall braking moment bsoll. In this way, an advantageously rapid charging of the chargeable battery can be ensured even in the case of a brake actuation with a comparatively small brake actuation path s that decreases over time.

Hydraulic braking moments b1 and b2 can be kept equal to zero. The enlargement of the second pressure chamber associated with the decrease over time of brake actuation path s can be compensated via a suctioning of a brake fluid volume out of the brake medium reservoir, without a brake pressure building up in the wheel brake cylinders of the decouplable second brake circuit. The wheel inlet valves of the decouplable second brake circuit can here also be open. The first valve can be completely opened by a supply current having a maximum first current strength I1, for the suctioning of the brake fluid volume.

The procedure reproduced on the basis of FIGS. 6A through 6D can also be described as being that, at the jump-in, the inlet valves of the second brake circuit are closed and the separating valve is opened. Through a regulated operation of the first valve, up to third boundary path s3 volume can be displaced back into the brake medium reservoir from the first brake circuit, via a displacement of the floating piston between the two pressure chambers of the master brake cylinder. The omitted first hydraulic braking moment b1 is compensated in parallel fashion, through an increase of generator braking moment bgen. Through the closing of the wheel inlet valves of the decouplable second brake circuit, a brake pressure buildup can be avoided in the wheel brake cylinders of the second brake circuit. Due to this strategy, beginning from a brake actuation path equal to third brake actuation path s3 the initial state of a braking within the jump-in region prevails.

The methods described above can also be used in a vehicle having a generator on the rear axle, on the decouplable axle, or in a vehicle in which the generator acts on all four wheels. In particular in the case of a vehicle equipped with a generator on the decouplable axle, the strategy of an "overbraking of the decouplable axle," in particular the rear axle, can also be applied, contributing to an increase in the recuperative efficiency. Through a corresponding switching of the inlet valves, the hydraulic pressure buildup for masking can be carried out at the front axle, at the rear axle, or also at all axles simultaneously.

What is claimed is:

1. A control device for a brake system of a vehicle, comprising:
   a valve control device for determining:
      a first target state of a first valve of the brake system that is connected to a master brake cylinder of the brake system and to a fluid storage device of the brake system so that a brake fluid volume can be displaced out of the master brake cylinder into the fluid storage device via the first valve, the first valve being controlled into an at least partly open state;
   wherein:
      the valve control device determines the first target state using a provided information signal relating to a generator braking moment of a generator that is one of currently being exerted and to be exerted;
      the valve control device outputs a first control signal, corresponding to the first target state, to the first valve; and
      via the valve control device, the first target state can be determined for the first valve connected, via at least one intake line, to a brake medium reservoir of the brake system as the fluid storage device;
   a second target state of a second valve of the brake system, situated as separating valve between the master brake cylinder and a brake circuit of the brake system having the first valve and having at least one wheel brake cylinder;
   wherein the valve control device:
      determines the second target state using at least one of a first sensor signal relating to at least one actuation strength of an actuation of a brake actuating element of the brake system, the information signal, and the first target state;
      outputs a second control signal, corresponding to the second target state, to the second valve; and
      compares the first sensor signal with a specified comparison signal with regard to a minimum actuation strength from which a driver's braking force applied to the brake actuating element can be transmitted to a displaceable master brake cylinder piston of the master brake cylinder, wherein a supporting force can be exerted on the displaceable master brake cylinder piston of the master brake cylinder even when the actuation strength is lower than the minimum actuation strength, and;
      if the first sensor signal is below the comparison signal, the valve control device controls the second valve into an at least partly open state so that the brake fluid volume pressed out of the master brake cylinder can be displaced into the brake circuit via the second valve; and
      if not, the valve control device controls the second valve into a closed state so that a hydraulic connection between the master brake cylinder and the brake circuit is prevented.

2. The control device as recited in claim 1, further comprising:
   a pump control device for outputting a pump control signal to a pump of the brake system responsive to a determination that, given an increase over time of the at least one actuation strength, the first sensor signal approaches the comparison signal, through which pump control signal the pump can be controlled to pump the brake fluid volume out of the brake medium reservoir into the master brake cylinder via the second valve, the second valve being in the at least partly open state.

3. The control device as recited in claim 1, further comprising:
a generator control device by which the generator braking moment of the generator that is to be exerted can be determined, using at least one of the first sensor signal and a signal corresponding to at least one of a second sensor signal and a second information signal relating to at least one possible generator braking moment that can be executed, and by which a generator control signal corresponding to the determined generator braking moment that is to be exerted can be outputted to the generator.

4. A brake system for a vehicle, comprising:
a control device for a brake system of a vehicle that includes:
    a valve control device for determining:
        a first target state of a first valve of the brake system that is connected to a master brake cylinder of the brake system and to a fluid storage device of the brake system so that a brake fluid volume can be displaced out of the master brake cylinder into the fluid storage device via the first valve, the first valve being controlled into an at least partly open state;
        wherein:
            the valve control device determines the first target state using a provided information signal relating to a generator braking moment of a generator that is one of currently being exerted and to be exerted;
            the valve control device outputs a first control signal, corresponding to the first target state, to the first valve; and
            via the valve control device, the first target state can be determined for the first valve connected, via at least one intake line, to a brake medium reservoir of the brake system as the fluid storage device;
        a second target state of a second valve of the brake system, situated as separating valve between the master brake cylinder and a brake circuit of the brake system having the first valve and having at least one wheel brake cylinder; wherein the valve control device:
            determines the second target state using at least one of a first sensor signal relating to at least one actuation strength of an actuation of a brake actuating element of the brake system, the information signal, and the first target state;
            outputs a second control signal, corresponding to the second target state, to the second valve; and
            compares the first sensor signal with a specified comparison signal with regard to a minimum actuation strength from which a driver's braking force applied to the brake actuating element can be transmitted to a displaceable master brake cylinder piston of the master brake cylinder, wherein a supporting force can be exerted on the displaceable master brake cylinder piston of the master brake cylinder even when the actuation strength is lower than the minimum actuation strength, and:
                if the first sensor signal is below the comparison signal, the valve control device controls the second valve into an at least partly open state so that the brake fluid volume pressed out of the master brake cylinder can be displaced into the brake circuit via the second valve; and
                if not, the valve control device controls the second valve into a closed state so that a hydraulic connection between the master brake cylinder and the brake circuit is prevented.

5. A method for operating a brake system of a vehicle, comprising:
determining a first target state of a first valve of the brake system, the first valve being connected to a master brake cylinder of the brake system and to a fluid storage device of the brake system so that a brake fluid volume can be displaced out of the master brake cylinder into the fluid storage device via the first valve, the first valve being controlled into an at least partly open state, using a generator braking moment quantity relating to a generator braking moment of a generator that is one of currently being exerted and to be exerted;
controlling the first valve, using the determined first target state;
determining the first target state for the first valve connected, via at least one intake line, to a brake medium reservoir of the brake system as the fluid storage device;
determining a second target state of a second valve of the brake system, situated as a separating valve between the master brake cylinder and a brake circuit of the brake system having the first valve and at least one wheel brake cylinder, the determining of the second target state using at least one of an actuation strength quantity relating to at least one actuation strength of an actuation of a brake actuating element of the brake system, the generator braking moment quantity, and the first target state;
controlling the second valve using the determined second target state;
comparing the actuation strength quantity with a minimum actuation strength quantity relating to a minimum actuation strength from which a driver's braking force applied to a brake actuating element is transmitted to a displaceable master brake cylinder piston of the master brake cylinder, wherein a supporting force can be exerted on the displaceable master brake cylinder piston of the master brake cylinder even when the actuation strength is lower than the minimum actuation strength;
if the actuation strength quantity is below the minimum actuation strength quantity, controlling the second valve into an at least partly open state so that a brake fluid volume pressed out of the master brake cylinder is displaced into the brake circuit via the second valve; and
if not, controlling the second valve into a closed state so that a hydraulic connection between the master brake cylinder and the brake circuit is prevented.

6. The method as recited in claim 5, further comprising:
comparing the generator braking moment quantity with a specified minimum braking moment quantity;
if the generator braking moment quantity is greater than the minimum braking moment quantity, controlling the first valve into the at least partly open state so that the brake fluid volume pressed out of the master brake cylinder is displaced into the brake medium reservoir via the first valve; and if not, controlling the first valve into a closed state so that a hydraulic connection between the master brake cylinder and the brake medium reservoir is prevented.

7. The method as recited in claim 5, further comprising: pumping a brake fluid volume out of the brake medium reservoir into the master brake cylinder by a pump of the brake system via the second valve, the second valve being in the at least partly open state, responsive to a determination that the actuation strength quantity goes toward the minimum actuation strength quantity given an increase over time of the actuation strength quantity.

8. The method as recited in claim 7, further comprising: controlling the second valve into the at least partly open state, responsive to a determination that the actuation strength quantity goes toward the minimum actuation strength quantity given a decrease over time of the actuation strength quantity, so that the brake fluid volume is transferred out of the brake medium reservoir into the master brake cylinder via the second valve, the second valve being in the at least partly open state.

* * * * *